United States Patent [19]

Croghan

[11] Patent Number: 5,682,834
[45] Date of Patent: Nov. 4, 1997

[54] EARTHQUAKE ALARM

[76] Inventor: Morris T. Croghan, 106 Papineau Road, Fulford, Quebec, Canada, J0E 1S0

[21] Appl. No.: 567,091

[22] Filed: Dec. 4, 1995

[51] Int. Cl.$^6$ .............................. G08B 7/00; G10K 1/00
[52] U.S. Cl. .................... 116/4; 116/203; 116/162
[58] Field of Search .................... 116/4, 91, 111, 116/162, 203, 215; 73/649; 33/1 HH

[56] References Cited

U.S. PATENT DOCUMENTS

| | | | |
|---|---|---|---|
| 315,838 | 4/1885 | Reiff | 116/91 |
| 746,147 | 12/1903 | Peters | 116/111 |
| 1,443,402 | 1/1923 | Weitzman | 116/111 |
| 2,085,860 | 7/1937 | Lambert | 116/162 |
| 2,469,528 | 5/1949 | Suma, Sr. | 116/91 |
| 2,632,887 | 3/1953 | Rusnak | 116/91 |
| 4,058,134 | 11/1977 | Komatsu et al. | 116/203 |
| 4,124,841 | 11/1978 | Kettunen | 340/690 |
| 4,297,690 | 10/1981 | Baker | 340/690 |
| 4,484,186 | 11/1984 | Wood et al. | 116/303 |
| 4,764,761 | 8/1988 | Maguire, III | 340/690 |
| 4,764,762 | 8/1988 | Almour | 340/690 |
| 5,278,540 | 1/1994 | Caban-Domenech | 340/601 |
| 5,408,862 | 4/1995 | Elkins | 340/690 |

*Primary Examiner*—William A. Cuchlinski, Jr.
*Assistant Examiner*—Willie Morris Worth

[57] ABSTRACT

The present invention relates to an earthquake alarm that functions as an awakening and early warning mechanism which provides an audio and visual warning to a possible earthquake. The device is comprised of a free-standing arm which rests against an adjustable rod which can be manipulated to make the arm more or less sensitive to vibrations. The arm, which is pivotally mounted within a case, swings downwardly through a slot in the case when vibrations comparable to the vibrations of an earthquake cause the arm to be dislodged from its upright position. The arm is entrapped between two tabs that extend outwardly from a rotatably attached beam. The beam comprises a third tab which is secured against one distal end of a rocker arm, the opposite distal end of the rocker arm being engaged in the extended teeth of a spring loaded wheel. A vibration sufficient to cause the arm to be dislodged from its upright position and swing downwardly causes the beam to rotate in conjunction with the arm thereby releasing the rocker arm. A spring located underneath the wheel spins causing the rocker arm to repeatedly strike a bell. To reset the device, an individual is required to rewind the spring in order to reposition the arm in an upright position.

25 Claims, 3 Drawing Sheets

EARTHQUAKE ALARM

BACKGROUND OF THE INVENTION

1. Field of the Invention

The present invention relates to an earthquake alarm. More particularly, the present invention relates to an earthquake alarm which is activated as a result of vibrations such as those created by earthquakes, thereby causing a free-standing arm to swing downwardly, activating causing a spring-loaded alarm to sound.

2. Description of the Prior Art

A prevalent fear that exists among people throughout the world is the fear associated with the devastating effects of natural disasters. Among the most dreaded natural occurrences are earthquakes, which have unlimited potential for death and destruction. What is likely the most unnerving aspects of earthquakes is the lack of warning before an earthquake strikes. Oftentimes several moments may be the difference between life and death, particularly where the individual is in an vulnerable or dangerous location. This problem is particularly acute in the instance where one is asleep, and is unable to sense the onset of a possible disaster. The sounding of an alarm might afford such an individual a precious few moments to escape imminent harm by taking immediate action. It would also be necessary to make the device affordable, in order to have the same available to any individual who needs it. Moreover, it would also be beneficial if the device were simple to operate, without the need for complicated instructions or constant monitoring to ensure that the device is functioning properly. Further, a mechanism which allows the individual to adjust the device to essentially screen out unrelated vibrations such as trucks, trains, trolleys and so forth in order to reduce false alarms is also a necessary feature.

Numerous innovations for an earthquake alarm have been provided in the prior art that are described as follows. Even though these innovations may be suitable for the specific individual purposes to which they address, they differ from the present invention as hereinafter contrasted.

U.S. Pat. No. 5,278,540 to Caban-Domenech discloses an electromechanical earthquake alarm which has a free-failing projectile that drops from a platform onto a bell causing the bell to activate a buzzer which is battery activated. This patent differs from the present invention because this patent employs the use of a ball to activate a buzzer whereas the present invention utilizes a free-swinging arm that activates a bell.

U.S. Pat. No. 5,408,862 to Elkins discloses an earthquake early warning system comprised of a subterranean detector unit which has a plurality of gas detector units intended to monitor the migration of gases in the event of an earthquake. This patent differs from the present invention because this patent is a fixed, subterranean device whereas the present patent is a portable device which functions above the earth's surface. Moreover, the present invention utilizes a free-swinging arm that activates a bell.

U.S. Pat. No. 4,764,762 to Almour discloses an earthquake alarm assembly designed to warn individual's of earthquakes. This patent differs from the present invention because this patent is powered electrically, whereas the present invention utilizes a spring-powered arm. Moreover, the present invention has an adjustable sensitivity mechanism enabling the user to manipulate the same to avoid accidental tripping of the alarm in areas where there are significant sources of vibration (i.e. planes, cars, trucks, etc.). This feature is not disclosed in the present patent.

U.S. Pat. No. 4,124,841 to Kuttunen discloses a motion detection device comprised of a pin mounted on a platform which falls onto a contact plate creating an electrical circuit thereby activating an alarm. This patent differs from the present invention because a spring loaded alarm activated by a free-swinging arm is not disclosed.

U.S. Pat. No. 4,764,761 to Maguire, III discloses an earthquake alarm having a flee-falling ball which, when activated by vibrations, drops onto a contact plate thereby creating an electric circuit which sounds an alarm. This patent differs from the present invention because a spring loaded alarm activated by a free-swinging arm is not disclosed. Moreover, a sensitivity adjustment mechanism is not disclosed in the present patent.

U.S. Pat. No. 4,297,690 to Baker discloses an earthquake alarm system having an inertial mass element that is adapted to detect lateral movement between the mass and the relative supporting member. This patent differs from the present invention because a spring loaded alarm activated by a free-swinging arm is not disclosed.

Numerous innovations for an earthquake alarm have been provided in the prior art that are adapted to be used. Even though these innovations may be suitable for the specific individual purposes to which they address, they would not be suitable for the purposes of the present invention as heretofore described.

SUMMARY OF THE INVENTION

In accordance with the present invention, a earthquake alarm is comprised of a case which contains an arm pivotally attached on one end to a pin that is secured to the case. In its fixed position, the arm stands upright and rests against a rod which is slidably housed along the top of the earthquake alarm. The rod is threaded, and may be adjusted forward or backward by means of a rod knob which is turned either clockwise or counter clockwise. The arm further has a beam which is pivotally attached over said arm and secured thereto by means of the pin. The beam is comprised of a beam trip tab, a beam spring tab, a beam reset tab and a beam load tab. The arm has restricted movement between the beam trip tab and the beam reset tab, which beam trip tab and beam reset tab extend perpendicularly from the beam and prevent the arm from escaping the beam. When an earthquake begins, subterranean vibrations dislodge the arm from its upright position and cause the arm to swing downwardly. As the arm swings downwardly, the arm makes contact with the beam trip tab causing the beam to rotate in a counter-clockwise manner, moving in conjunction with the downward motion of the falling arm. The counter-clockwise rotation of the beam further causes the beam load tab to release a rocker arm that has a rocker arm foot attached thereto. The rocker arm foot disengages from a spring-loaded wheel with a tooth-like configuration. The front of the rocker arm foot is lodged between the teeth of the wheel, and is released therefrom when the beam swings downwardly. Protruding distal ends of the rocker arm foot alternately and repeatedly strike the extended teeth of the wheel, causing the rocker arm striker, which is located on the top of the rocker arm, to continually strike the bell. A blocking arm pivotally mounted within the case by means of a blocking arm pin. The blocking arm is connected to a blocking arm spring which holds the blocking arm in an upright position. The blocking arm further rests gently against a coiled wheel main spring, housed underneath the wheel, when the arm is in the upright position. When vibrations cause the earthquake alarm to be activated, the coiled wheel main spring unwinds and therefore expands, forcing the blocking arm forward and downward blocking the case slot to the fallen arm. Once the earthquake alarm has been activated, the arm cannot be reset to its upright position without first retracting the blocking arm from the case slot. Rewinding the wheel main spring causes same to decrease in diameter allowing the blocking arm spring to pull the blocking arm back to an upright position retracting it from the case slot and allowing the fallen arm to be reset in the upright position. This mechanism insures that the alarm has power if the arm is in the upright set position.

The earthquake alarm is preferably attached to a wall or similar vertical surface by means of attachment elements secured as to either distal end of the earthquake alarm. Alternatively, the earthquake alarm can rest on a stable, horizontal surface. In addition, the arm is brightly colored and provides a visual alarming means in the event of an earthquake. Moreover, a visual signal is provided in the event the earthquake alarm has been activated and needs to be reset.

Accordingly, it is an object of the present invention to provide an earthquake alarm.

More particularly, it is an object of the present invention to provide an earthquake alarm specifically adapted to warn sleeping or resting individuals of a pending earthquake.

In keeping with these objects, and with others which will become apparent hereinafter, one feature of the present invention resides, briefly stated, in that the earthquake alarm sounds a warning of an impending earthquake, thereby alerting sleeping or resting individuals and allowing a measure of time to undertake appropriate action.

When the earthquake alarm is designed in accordance with the present invention, it provides the user with an audio and visual warning of a possible earthquake.

Another feature of the present invention is its versatile construction, enabling the earthquake alarm to be manufactured in a variety lengths and widths to accommodate the various demands of the individual.

Another feature of the present invention is that it is simple to use, requiring the user to merely position the arm upright while winding the alarm.

Yet another feature of the present invention is that is its versatile adaptability, enabling the earthquake alarm to be placed on a sturdy, flat surface or mounted on a wall, cabinet, dresser or similar object.

Still another feature of the present invention is that the case may be manufactured from a number of different materials including, but not limited to: wood, metal, metal alloy, plastic, plastic composite and fiberglass.

Still yet another feature of the present invention is the simplicity of design, which would facilitate the manufacture and production of the earthquake alarm.

Yet another feature of the present invention is that the earthquake alarm is easy to maintain, because the device does not rely on the use of batteries, electricity, or other extraneous power source.

Another feature of the present invention is that the earthquake alarm has an adjustment mechanism making the device more or less sensitive to vibrations, which prevents the device from being inadvertently activated in areas where there are numerous sources of vibrations such as a city, industrial or commercial area and so forth.

Yet still another feature of the present invention is that the earthquake alarm is that the bell will sound for only a limited duration because it is spring loaded, thereby precluding the need to manually shut the device off, particularly where there is a false alarm.

Another feature of the present invention is that it is simple to reset, requiring the user to merely reposition the arm upright while rewinding the alarm.

Still yet another feature of the present invention is that the device may be manufactured with an alternative alarming means such as a battery-connected buzzer or flashing mechanism.

Another feature of the present invention is that the brightly colored arm provides a visual warning that the device needs to be reset.

Yet another feature of the present invention is that the wheel main spring must be rewound before the arm can be reset to its upright position.

The novel features which are considered characteristic for the invention are set forth in the appended claims. The invention itself, however, both as to its construction and its method of operation, together with additional objects and advantages thereof, will be best understood from the following description of the specific embodiments when read and understood in connection with the accompanying drawings.

BRIEF LIST OF REFERENCE NUMERALS UTILIZED IN THE DRAWING 10-earthquake alarm 10
12-case 12
12A-case slot 12A
12B-case arm stop 12B
12C-case speaker 12C
14-arm 14
14A-arm front extension 14A
14B-arm base 14B
14C-arm rear extension 14C
16-pin 16
18-beam 18
18A-beam trip tab 18A
18B-beam spring tab 18B
18C-beam reset tab 18C
18D-beam load tab 18D
20-expansion spring 20
22-rocker arm 22
22A-rocker arm foot 22A
22B-rocker arm striker 22B
24-wheel 24
24A-wheel pin 24A
24B-wheel handle 24B
24C-wheel main spring 24C
26-blocking arm 26
26A-blocking arm pin 26A
26B-blocking arm spring 26B
28-rod 28
28A-rod crown 28A
28B-rod knob 28B
28C-rod housing 28C
30-bell 30
32-top attachment means 32
34-bottom attachment means 34
36-fastening means 36
38-weighted member 38

BRIEF DESCRIPTION OF THE PREFERRED EMBODIMENT

DETAILED DESCRIPTION OF THE PREFERRED EMBODIMENT

Figure 1:
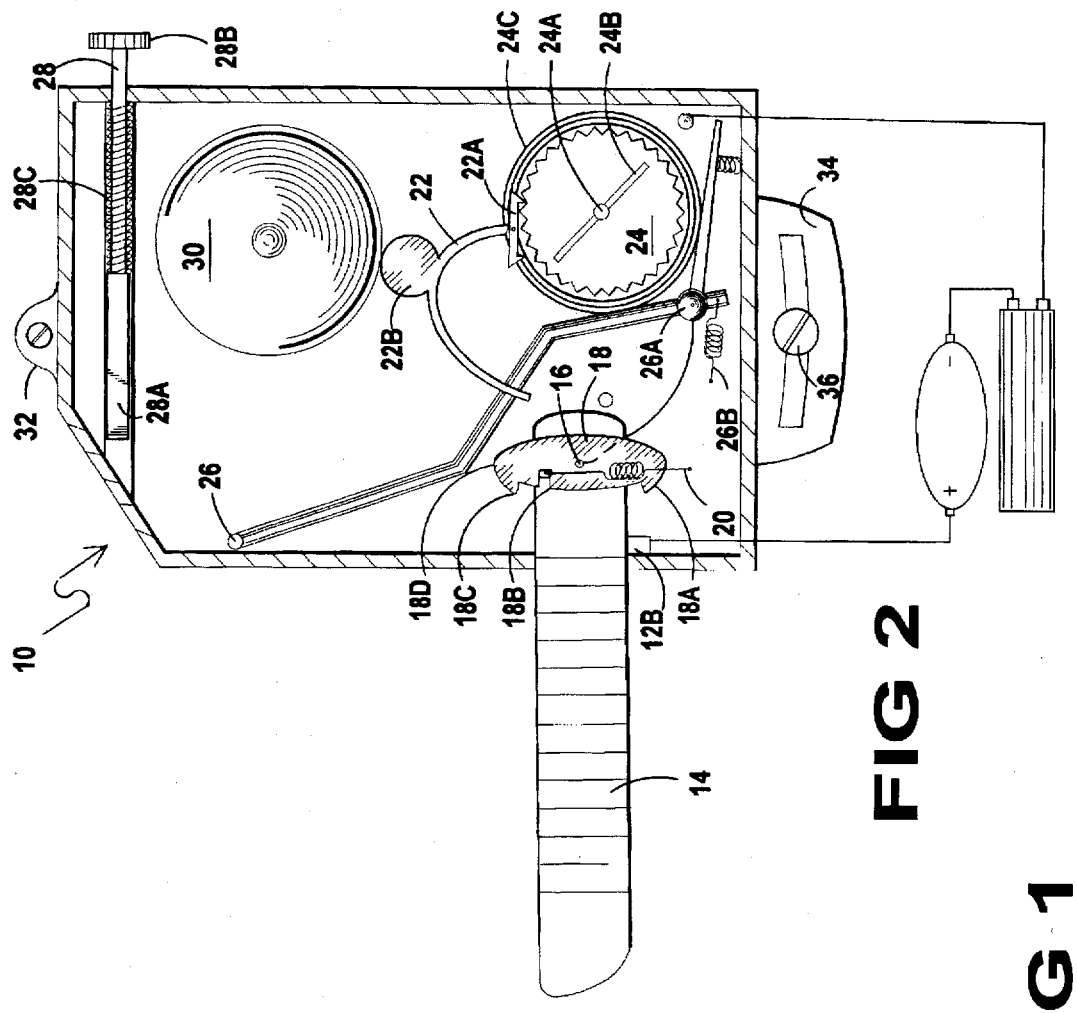
FIG. 1 is a front view of the earthquake alarm exhibiting the interior of the device, with the arm standing upright in the set position.
Figure 2:
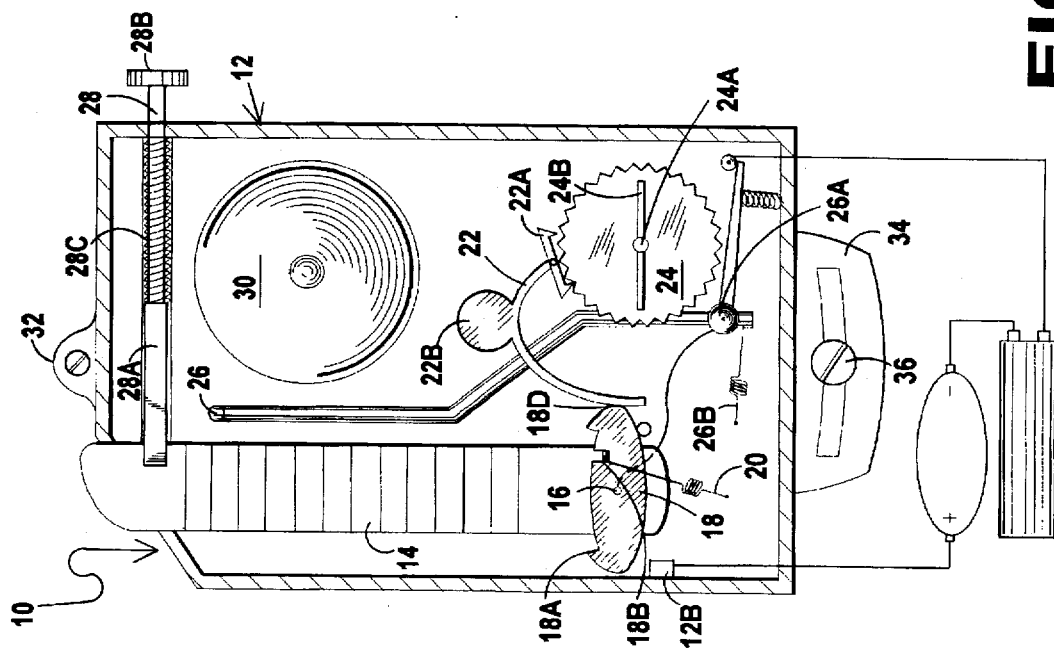
FIG. 2 is a front view of the earthquake alarm exhibiting the interior of the device as the alarm is being activated.

Firstly, referring to FIG. 1 which is a front view of the earthquake alarm 10 exhibiting the following features: case 12; case slot 12A; case arm stop 12B; case speaker 12C; arm 14; pin 16; beam 18; beam trip tab 18A; beam spring tab 18B; beam reset tab 18C; beam bad tab 18D; expansion spring 20; rocker arm 22; rocker arm foot 22A; rocker arm striker 22B; wheel 24; wheel pin 24A; wheel handle 24B; wheel main spring 24C; blocking arm 26; blocking arm pin 26A; blocking arm spring 26B; rod 28; rod crown 28A; rod knob 28B; rod housing 28C; bell 30; top attachment means 32; bottom attachment means 34; fastening means 36; and weighted member 38. The case 12 is manufactured from a group of materials consisting of wood, metal, metal alloy, plastic, plastic composite, epoxy and fiberglass. One side of the case has a case slot 12A through which an arm 14 protrudes. The arm 14 is pivotally mounted to the case 12 on one distal end by means of a pin 16, which enables the arm 14 to swing downwardly from its original, upright position. The opposite distal end of the arm 14 extends outwardly from the case 12 through a case slot 12A located along one side of the case 12. A case arm stop 12B stops the arm 14 once the arm 14 has begun moving downwardly and holds the same in an approximately horizontal position. When the arm 14 rests on top of the case arm stop 12B, the mid-section of the arm 14 is exposed, which mid-section is brightly colored and is therefore visible to an individual. As a result, when the earthquake alarm 10 is activated, the fallen arm 14 provides a visual warning to an individual. Moreover, the exposed arm 14 alerts an individual to the fact that the earthquake alarm 10 has been activated, and must therefore be reset. A beam 18 is alongside the pivotally mounted end of the arm 14, and is rotatably attached thereon by means of the pin 16. The beam 18 is comprised of a beam trip tab 18A, a beam spring tab 18B, a beam reset tab 18C and a beam load tab 18D, each of which extend outwardly from the beam 18. The arm 14 has limited movement between the beam trip tab 18A and the beam reset tab 18C, both of which extend perpendicularly from the beam 18. An expansion spring 20 is secured under the beam spring tab 18B to enhance the action of the beam 18. When the earthquake alarm 10 is set, the arm 14 stands upright, with the end opposite the pivotally mounted end resting against a rod crown 28A which is attached to one distal end of a rod 28 that is slidably contained in a rod housing 28C which is attached to the top of the earthquake alarm 10. The opposite distal end of the rod 28 has a rod knob 28B attached thereto, which rod knob 28B is turned clockwise in order to move the rod 28, which is threaded, inwardly, or counter clockwise in order to move the rod 28 outwardly. When the arm 14 is in the upright position, the beam load tab 18D rests against the rocker arm 22, which is comprised of a rocker arm foot 22A perpendicularly attached thereto. The rocker arm 22 further has a rocker arm striker 22B protruding upwardly from the rocker arm 22. The rocker arm foot 22A has a tooth on either end which extend downwardly. When the arm 14 is in the upright position, the front end of the rocker arm foot 22A is engaged with a wheel 24, which wheel 24 is comprised of teeth wherein the rocker arm foot 22A is lodged, thereby preventing the wheel 24 from moving. The wheel 24 and wheel main spring 24C are rotatably mounted on a wheel pin 24A which is rigidly attached to the case 12. The wheel 24 and wheel main spring 24C are wound by means of a wheel handle 24B secured to the wheel 24 by the wheel pin 24A. A blocking arm 26 is pivotally mounted on one distal end to the case 12 by means of a blocking arm pin 26A. A blocking arm spring 26B holds the blocking arm 26 in an upright position, resting gently against the wheel main spring 24C Referring to FIG. 2 which is a front view of the earthquake alarm 10 exhibiting the top attachment means 32 and the bottom attachment means 34 with a fastening means 36 inserted therein. The top attachment means 32 and the bottom attachment means 34 enable the earthquake alarm 10 to be mounted to a wall, cabinet, dresser and so forth. Moreover, because the top attachment means 32 and the bottom attachment means 34 are located on the top and the bottom of the earthquake alarm 10, respectively, the device can be mounted and secured at a position perpendicular to the ground. The arm 14 is stood upright and rests against a rod crown 28A attached to a threaded rod 28. The arm 14 is intended to fall downwardly when a vibration, which is strong enough to dislodge the arm 14 from an upright position, occurs. The arm 14 may be made more sensitive to vibrations by moving the rod 28 forwards and less sensitive to vibrations by moving the rod 28 backwards. This allows the user to adjust the earthquake alarm's 10 sensitivity in accordance with the nature of the area where the device will be used (i-e. a city, commercial area, etc.) When a vibration sufficient to cause the arm 14 to fall occurs, the arm 14 swings downwardly through the case slot 12A. The falling arm 14 strikes the beam trip tab 18A forcing the same downwardly, causing the beam 18 to rotate in a counter-clockwise direction in conjunction with the arm 14. The rotation of the beam 18 causes the beam load tab 18D to move upwardly, releasing the rocker arm 22 which in turn disengages the front of the rocker arm foot 22A from the extended teeth of the wheel 24. The rear of the rocker arm foot 22A then rests against the teeth of the wheel 24. Because the wheel 24 is spring loaded, the wheel 24 begins to spin, causing the front and rear of the rocker arm foot 22A to alternately and repeatedly engage and disengage the teeth of the wheel 24. The rocker arm striker 22B continually hits the bell 30 causing an audible warning. The sound of the bell 30 being struck emanates from the case speaker 12C, thereby warning individuals of a potential earthquake. The case 12 completely surrounds the various mechanisms of the earthquake alarm 10, except for the arm 14, rod knob 28B and wheel handle 24B which protrude from the case 12, and the top attachment means and the bottom attachment means which extend outwardly from the earthquake alarm 10. Alternatively, a buzzer or flashing light can be used in place of, or in conjunction with, with bell 30 in order to provide a different alarming means. The buzzer or light is connected to a battery, and is activated when the arm swings downwardly and touches a contact point situated at the case arm stop 12B, thereby completing a circuit. A bar, attached on one end to the base of the blocking arm pin 26A has a light coiled compression spring located underneath the same. The other end of the bar has a contact point that completes the circuit. When the earthquake alarm 10 is activated, the unwinding and expansion action of the wheel main spring 24C spring forces the unattached contact end of the bar downwards off the contact point, thereby interrupting the circuit and shutting off the buzzer or light. This feature ensures that the buzzer or light will activate only for a brief duration.

Figure 3:
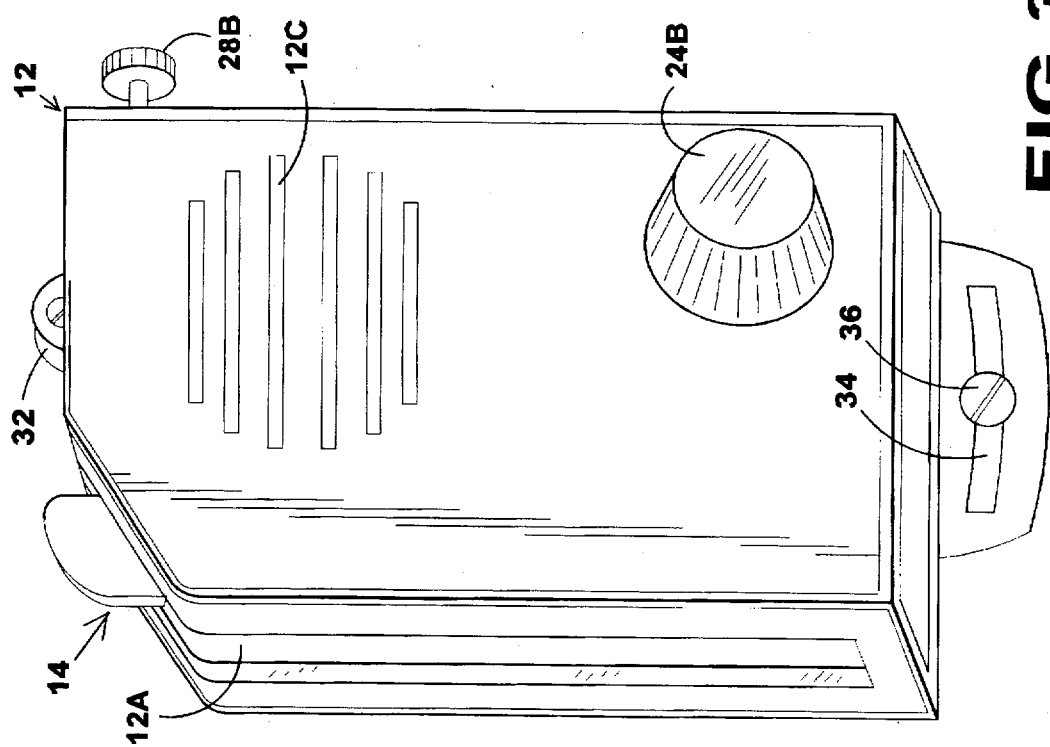
FIG. 3 is a front perspective view of the earthquake alarm.

Referring to FIG. 3 which is a front perspective view of the earthquake alarm 10 exhibiting the arm 14 in the fixed position. The case speaker 12C is slotted into the case 12, allowing the sound of the bell 30, which is located directly behind the case speaker 12C, to emanate therefrom. The wheel handle 24B, which protrudes from the interior of the case 12 and extends outwardly from the front of the case 12, is configured to allow the user to easily manipulate the same with the use of his or her hand. Further, the rod knob 28B, which extends outwardly from the side of tile case 12, is also configured to enable the user to easily manipulate the same using his or her hand.

Figure 4:
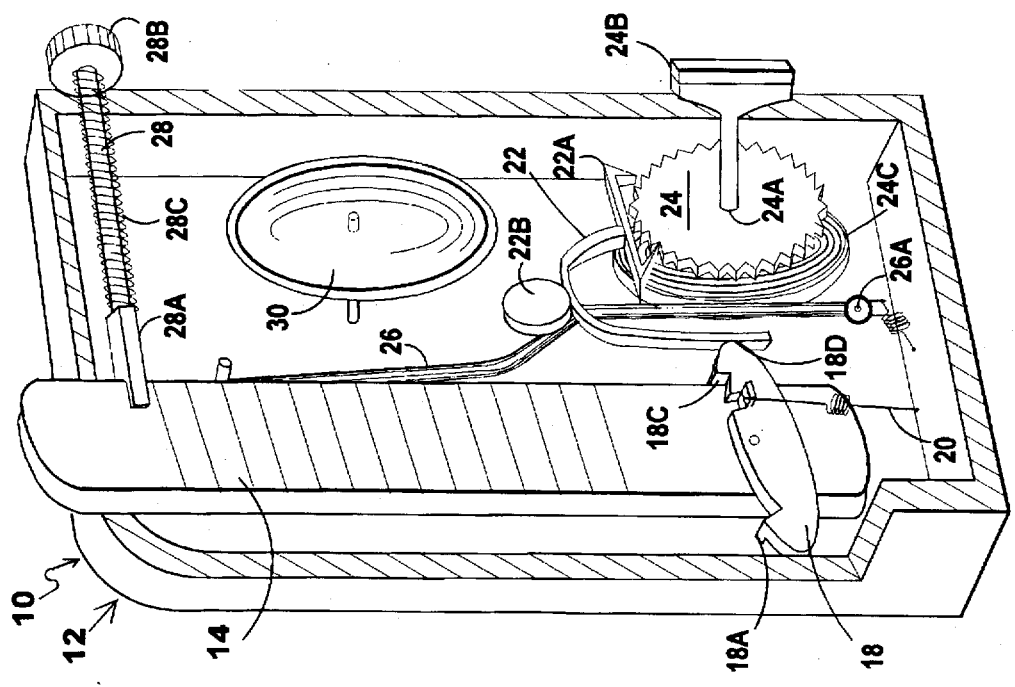
FIG. 4 is a side perspective view of the earthquake alarm with the front of the case removed.

Referring to FIG. 4 which is a side perspective view of the earthquake alarm 10 with the front of the case 12 removed.

Figure 5:
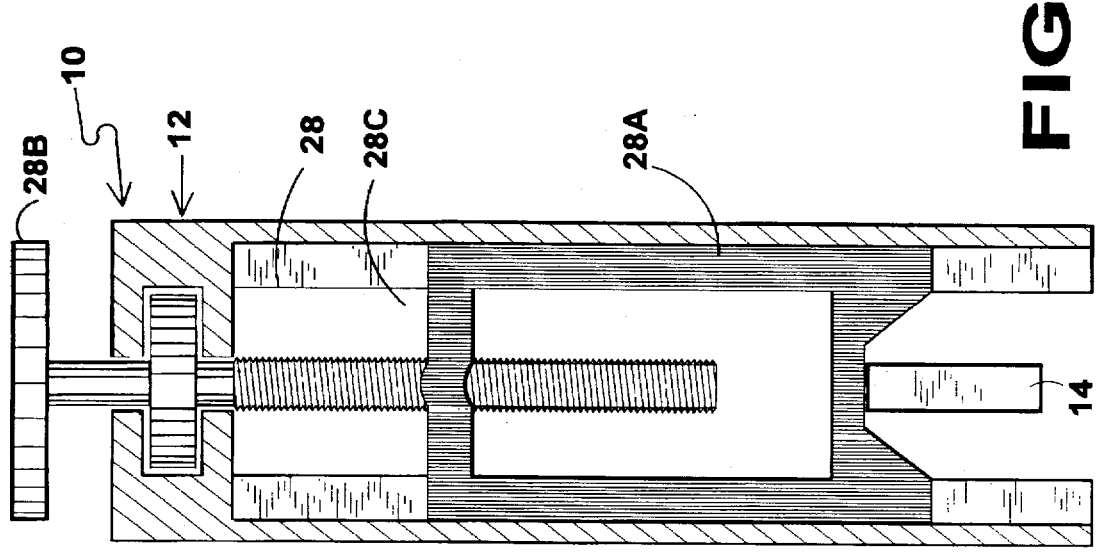
FIG. 5 is a top view of the rod assembly.

Referring to FIG. 5 which is a top view of the pin 10 assembly exhibiting the rod crown 28A secured to one distal end of the rod 28 and the rod knob 28B secured to the other distal end of the rod 28. The rod 28, which has a threaded configuration, is slidably contained in a rod housing 28C attached to the top of the earthquake alarm 10. The rod knob 28B is turned clockwise in order to move the rod 28 forwards and turned counter-clockwise to move the rod 28 backwards. The rod crown 28A has a concave configuration, which enables the arm 14 to rest securely against the rod crown 28A. To increase the arm's 14 sensitivity to vibrations, the rod 28 is move forwards, to reduce the arm's 14 sensitivity, the rod 28 is moved backwards. The rod 28 adjustability allows for a certain amount of versatility when the user is setting the arm 14 of the earthquake alarm 10. Specifically, a user in a noisy, commercial area would be inclined to move the rod 28 further back to eliminate false alarms caused by trucks, machines and so forth whereas a user in a rural area may be compelled to move the rod 28 forward, to enhance the sensitivity of the earthquake alarm 10.

Figure 6:
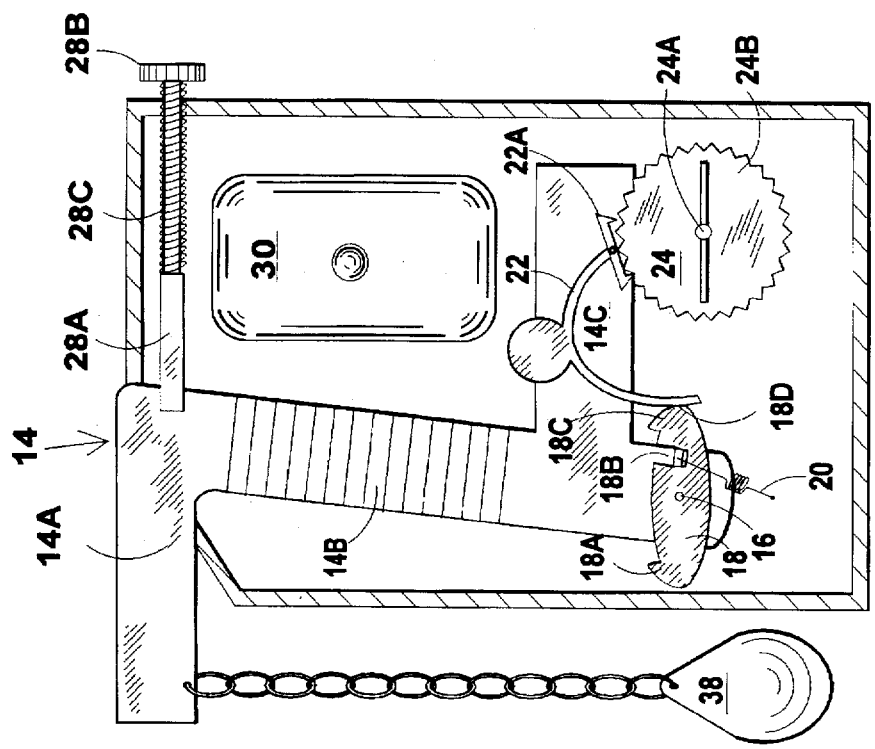
FIG. 6 is a front view of the earthquake alarm utilizing a weighted member to enhance the vibration sensitivity of the device and also eliminate the need for a blocking arm.

Referring to FIG. 6 which is a front perspective view of the earthquake alarm 10 utilizing a weighted member 38 to enhance the vibration sensitivity of the device. The arm 14 of the earthquake alarm 10 stands upright, and is either manipulated forward or backward in order to increase or reduce, respectively, the sensitivity of the arm 14 to vibrations. The arm 14 can also be configured to allow a weighted member 38 to be suspended from the same, which weighted member 38 is positioned on the arm 14 in order to enhance the vibration sensitivity of the arm 14. The arm 14 is Z-shaped, and is comprised of an arm front extension 14A, an arm base 14B and an arm rear extension 14C. The weighted member 38 is attached to the arm base 14B by means of an arm front extension 14A which extends outwardly from the top of the arm base 14B. The arm rear extension 14C is attached to the bottom of the arm base 14B, and extends outwardly, in a direction opposite to the arm front extension 14A. The arm rear extension 14C extends into the device through the case slot 12A and is positioned over the coiled wheel main spring 24C. When a vibration occurs, the distribution of weight transfers to the weighted member 38, causing the arm 14 to rotate downwardly, thereby activating the bell 30. When the arm 14 rotates downwardly, the coiled wheel main spring 24C under the rear arm extension 14A expands, thereby preventing the arm 14 from being reset once the earthquake alarm 10 has been activated. This feature, therefore, eliminates the need for the blocking arm 26.

It will be understood that each of the elements described above, or two or more together, may also find a useful application in other types of constructions differing from the type described above.

While the invention has been illustrated and described as embodied in an earthquake alarm, it is not intended to be limited to the details shown, since it will be understood that various omissions, modifications, substitutions and changes in the forms and details of the device illustrated and in its operation can be made by those skilled in the an without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An earthquake alarm comprising
 a) an arm, having one distal end protruding outwardly from a case through a case slot, the arm is pivotally mounted to a pin on an opposite proximal end, the pin is secured within an interior of the case, the case further has a case arm stop and a case speaker located thereon, the one distal end of the arm rests against a rod, the rod is slidably contained in a rod housing that is attached to a top of the earthquake alarm, the rod further comprises a rod knob, secured on an opposite end, protruding outwardly from the case,
 b) a beam comprised of a beam trip tab, a beam spring tab, a beam reset tab and a beam load tab which extend outwardly from the beam, the beam tip tab and the beam reset tab loosely entrap the arm, the beam is located beside the arm and is rotatably secured by means of the arm pin, the beam load tab is secured against one distal end of a rocker arm, an opposite end of the rocker arm has a rocker arm foot extending perpendicularly therefrom, the mid-section of the rocker arm has a rocker striker protruding upwardly in close proximity to a bell, the rocker arm foot is engaged in a spring loaded toothed wheel which is secured within the case by means of a wheel pin and the case by means of a wheel pin and spring loaded by a wheel main spring, the wheel further comprises a wheel handle attached thereto, the wheel handle protruding outwardly from the case, said bell being positioned in said case so as to be struck by said rocker arm striker;
 c) a blocking arm is pivotally mounted to the case on one end by means a blocking arm pin, the blocking arm further comprises a blocking arm spring which holds the blocking arm in an upright position resting gently against the wheel main spring, and allows the blocking arm to move backwards and forwards, a second end of said blocking arm blocking said case slot when said blocking arm moves forward; and
 d) a top attachment element and a bottom attachment element affixed to top of the case and the bottom of the case, respectively, the top attachment element and the bottom attachment element each having a fastening means inserted therein to attach the earthquake alarm to a vertical surface such as a wall.

2. The earthquake alarm as described in claim 1, wherein the case is manufactured from a group of materials consisting of wood, metal, metal alloy, plastic, plastic composite, fiberglass and epoxy.

3. The earthquake alarm as described in claim 2, wherein the earthquake alarm is manufactured in different lengths and widths.

4. The earthquake alarm as described in claim 1, wherein the mid-section of the arm is brightly and flourescently colored.

5. The earthquake alarm as described in claim 4, wherein the mid-section of the arm is visible when the arm is swung downwardly.

6. The earthquake alarm as described in claim 5, wherein the case arm stop is mounted to said case adjacent to said case slot prevents the arm from swinging beyond a point where the arm is approximately horizontal to the ground.

7. The earthquake alarm as described in claim 1, wherein the wheel mainspring is wound by means of the wheel handle.

8. The earthquake alarm as described in claim 7, wherein the rocker arm foot is engaged in the teeth of the wheel, thereby preventing the movement of the wheel.

9. The earthquake alarm as described in claim 1, wherein the rod, which is threaded to enable the same to be moved backwards and forwards, is manipulated by the rod knob.

10. The earthquake alarm as described in claim 9, wherein the rod is adjustable, the rod is moved forward to enhance the vibration sensitivity of the arm and backwards to reduce the vibration sensitivity of the arm.

11. The earthquake alarm as described in claim 10, wherein the rod crown has a concave surface, enabling the arm to rest securely against the rod.

12. The earthquake alarm as described in claim 1, wherein the fastening means is selected from a group of fastening means including a nail, screw, spike, peg, and bolt.

13. An earthquake alarm-comprising a) an arm, the arm having an arm from extension and an arm rear extension extending outwardly from an arm base in opposite directions, the arm further comprises a weighted member suspended from the arm front extension, the arm rear extension extends into a case over a wheel main spring, the arm further having one distal end protruding outwardly from the case through a case slot, the arm is pivotally mounted to a pin on an opposite end, the pin is secured within an interior of the case, the case further has a case arm stop and a case speaker located thereon, the one distal end of the arm rests against a rod crown which is attached to one distal end of a rod, the rod is slidably contained in a rod housing that is attached to a top of the earthquake alarm the rod further comprises a rod knob, secured on an opposite end, protruding outwardly from the case, b) a beam comprised of a beam trip tab, a beam spring tab, a beam reset tab and a beam load tab which extend outwardly from the beam, the beam trip tab and the beam reset tab loosely entrap the arm, the beam is located beside the arm and is rotatably attached by means of the arm pin, the beam load tab is secured against one distal end of a rocker arm, an opposite end of the rocker arm has a rocker arm foot extending perpendicularly therefrom, the mid-section of the rocker arm has a rocker striker protruding upwardly in close proximity to a bell, the rocker arm foot is engaged in a toothed wheel which is secured within the case by means of a wheel pin and spring loaded by said wheel mainspring, the wheel further comprises a wheel handle attached thereto, the wheel handle protruding outwardly from the case, said bell being positioned in said case so as to be struck by said rocker striker; and c) a top attachment element and a bottom attachment element affixed to top of the case and the bottom of the case, respectively, the top attachment element and the bottom attachment element each having a fastening means inserted therein functioning as a method to attach the earthquake alarm to a vertical surface such as a wall.

14. The earthquake alarm as described in claim 13, wherein the case is manufactured from a group of materials consisting of wood, metal, metal alloy, plastic, plastic composite, fiberglass and epoxy.

15. The earthquake alarm as described in claim 14, wherein the earthquake alarm is manufactured in different lengths and widths.

16. The earthquake alarm as described in claim 13, wherein the midsection of the arm is brightly and flourescently colored.

17. The earthquake alarm as described in claim 16, wherein the midsection of the arm is visible when the arm is swung downwardly.

18. The earthquake alarm as described in claim 17, wherein the case arm stop is mounted to said case adjacent said case slot prevents the arm from swinging beyond a point where the arm is approximately horizontal to the ground.

19. The earthquake alarm as described in claim 13, wherein the weight of the weighted member is offset by the weight of the arm rear extension, the arm therefore being greatly sensitive to vibrations.

20. The earthquake alarm as described in claim 13, wherein the wheel mainspring, is wound by means of the wheel handle.

21. The earthquake alarm as described in claim 20, wherein the rocker arm foot is engaged in the teeth of the wheel, thereby preventing the movement of the wheel.

22. The earthquake as described in claim 13, wherein the rod, which is threaded to enable the same to be moved backwards and forwards, is manipulated by the rod knob.

23. The earthquake alarm as described in claim 22, wherein the rod is adjustable, the rod is moved forward to enhance the vibration sensitivity of the arm and backwards to reduce the vibration sensitivity of the arm.

24. The earthquake alarm as described in claim 23, wherein the rod crown has a concave surface, enabling the arm to rest securely against the rod.

25. The earthquake alarm as described in claim 13, wherein the fastening means is selected from a group of fastening means including a nail, screw, spike, peg, and bolt.

* * * * *